(12) United States Patent
Blakeslee et al.

(10) Patent No.: US 6,955,034 B1
(45) Date of Patent: Oct. 18, 2005

(54) CROP CONDITIONER FRAME WITH INTERCHANGEABLE ROLLERS

(75) Inventors: Edward A. Blakeslee, Ephrata, PA (US); Phillip J. Ehrhart, Narvon, PA (US); Wayne D. Thaxton, Denver, PA (US); Edward H. Priepke, Lancaster, PA (US); Douglas S. Fitzkee, Ephrata, PA (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 10/898,051

(22) Filed: Jul. 24, 2004

(51) Int. Cl.$^7$ .............................................. A01D 82/00
(52) U.S. Cl. ................................................. 56/16.4 C
(58) Field of Search ....................... 56/16.4 R, 16.4 A, 56/16.4 B, 16.4 C, 16.4 D, 249.5

(56) References Cited

U.S. PATENT DOCUMENTS

| | | | | |
|---|---|---|---|---|
| 2,921,426 A | * | 1/1960 | Heth ................................ | 56/1 |
| 3,488,929 A | | 1/1970 | Hale | |
| 3,712,034 A | * | 1/1973 | Praca ...................... | 56/16.4 C |
| 3,890,770 A | * | 6/1975 | Milliken ................... | 56/16.4 A |
| 4,472,927 A | * | 9/1984 | Vogt et al. ................ | 56/16.4 R |
| 4,860,528 A | | 8/1989 | Seymour | |
| 4,896,483 A | | 1/1990 | O'Halloran et al. | |
| 4,903,468 A | * | 2/1990 | Haberkorn ............... | 56/16.4 R |
| 4,905,459 A | | 3/1990 | Seymour et al. | |
| 4,910,947 A | | 3/1990 | Seymour | |
| 5,181,461 A | * | 1/1993 | Viaud .......................... | 100/88 |
| 5,269,124 A | | 12/1993 | Barthel et al. | |
| 5,421,670 A | * | 6/1995 | Meirick ....................... | 404/124 |
| 5,531,062 A | * | 7/1996 | Pfrimmer ................. | 56/16.4 B |
| 5,992,133 A | * | 11/1999 | Walch et al. ..................... | 56/6 |
| 6,360,515 B1 | | 3/2002 | Cook | |
| 6,711,996 B1 | * | 3/2004 | Mackie ....................... | 100/169 |

* cited by examiner

Primary Examiner—Robert E. Pezzuto
Assistant Examiner—Nathan Mammen
(74) Attorney, Agent, or Firm—John William Stader

(57) ABSTRACT

The apparatus is a crop conditioner frame in which both conditioning rollers and the torsion bar assembly forcing them together are interchangeable with other such parts of different designs. The interchangeability of the rollers is accomplished by simultaneously changing the bearings for the rollers and the mounting fixtures holding the bearings, but constructing all the mounting fixtures at any location to be attachable by the same fasteners.

5 Claims, 3 Drawing Sheets

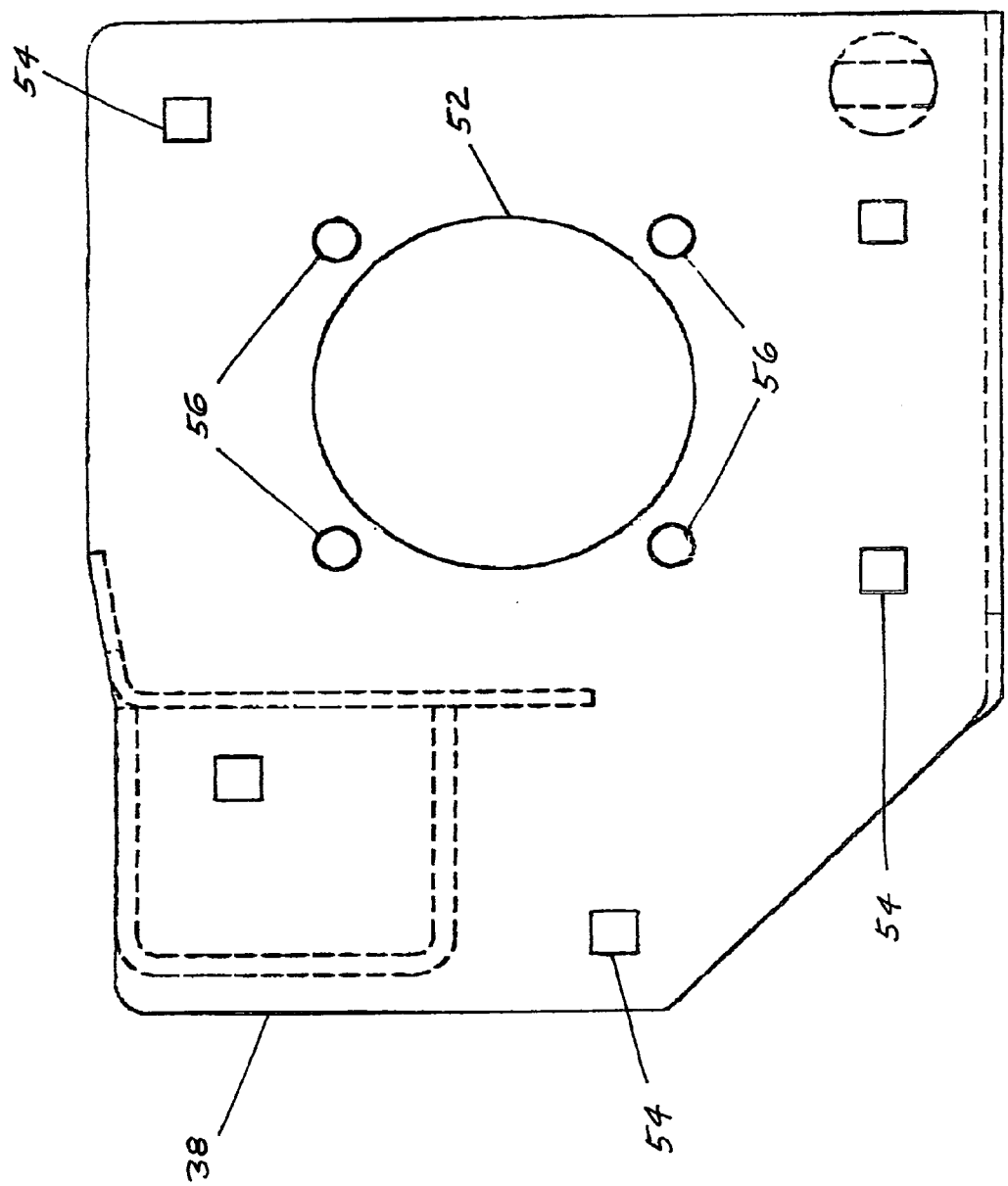

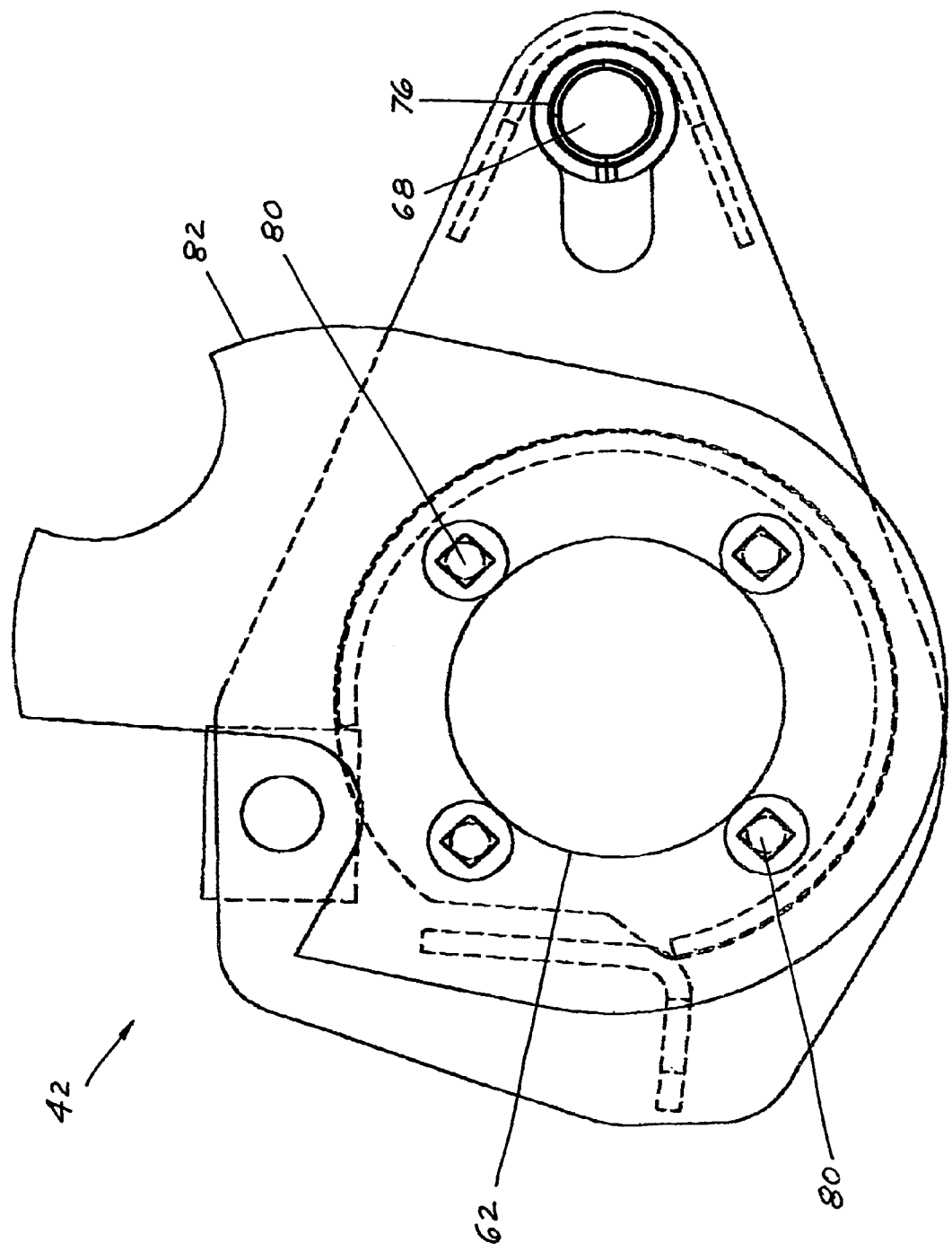

CROP CONDITIONER FRAME WITH INTERCHANGEABLE ROLLERS

BACKGROUND OF THE INVENTION

This invention deals generally with crop conditioners and more specifically with a crop conditioner structure that uses interchangeable conditioning rollers.

Hay harvesting machines, commonly referred to as mower-conditioners or windrowers, utilize a crop harvesting header to sever the hay crop from the ground and convey it to a conditioning mechanism that operates to crush or crimp the severed crop material at intervals along the stem of the crop to facilitate the transpiration and evaporation of liquids from the crop material plant. Conditioning mechanisms that utilize a pair of counterrotating, intermeshing conditioning rolls to condition the severed crop material are well known and are described in early U.S. Pat. No. 3,488,929 issued to J. K. Hale.

However, such crop conditioners have traditionally been constructed to hold only one specific set of conditioning rollers. That is, machines have been constructed with no anticipation of changing the rollers except for merely replacing rollers with others of the same design and size, and even then any change of rollers has required major effort. The one concession made to interchangeability has been the use of more easily removable complete conditioner assemblies, but such assemblies, which are costly, have been used mostly for replacement purposes.

Yet it has become apparent over the years that different crops can be conditioned more satisfactorily with different combinations of conditioning roller designs, roll gap adjustment, and range of roll pressure adjustment.

It would be very beneficial to have crop conditioners that are more flexible and for which different rollers and roller pressures were easily available. However, different rollers and roller pressures require other structural changes in a conditioner assembly, particularly in the bearings used to support the rollers, which can not be performed in the field setting.

SUMMARY OF THE INVENTION

The present invention permits the use of interchangeable conditioning rollers of different designs, including different sizes, without the need to replace the entire crop conditioner frame as has been required in the prior art, and the apparatus can also be easily modified to apply a different range of pressures between the rollers. It should be understood that the present invention does not change the operation of the conditioning rollers from their operation in prior art crop conditioners. Rather, the present invention allows for convenient changing of the design, size, gap spacing, and range of roll pressure of crop conditioning rollers as they are needed for different crops, without replacing the entire conditioner frame assembly.

Prior art crop conditioners use bearing assemblies that are a single size and not as strong as those needed for use with some larger or higher pressure rollers, but the present invention permits the use of both smaller roller shaft ends and bearings and also larger shaft ends and bearings that are required for larger or higher pressure crop conditioning rollers. In fact, the conditioner frame of the present invention can accommodate bearings of many sizes. This variation in roller shaft ends and bearings is accomplished without any significant changes in the design of the conditioner frame itself.

The variation in conditioning roller shaft end size is essentially accomplished by limiting virtually all the changes to interchangeable bearings and mounting fixtures. Each of these mounting fixtures is attached to one of the conditioner frame side sheets, and each individual mounting fixture is constructed to hold a particular size of bearing assembly within which a conditioning roller shaft end can be held, but all the mounting fixtures are attached to the side sheets at the same location and with the same fasteners regardless of the bearing size.

The present invention thereby permits the use on many designs and sizes of conditioning rollers and provides a versatility that has never before been available.

BRIEF DESCRIPTION OF THE DRAWINGS

FIG. 2 is a plan view of one of the lower mounting fixtures for attaching the lower conditioning roller to the side sheets.

FIG. 3 is a plan view of one of the mounting fixtures for supporting the upper conditioning roller adjacent to the side sheet.

DETAILED DESCRIPTION OF THE INVENTION

Figure 1:
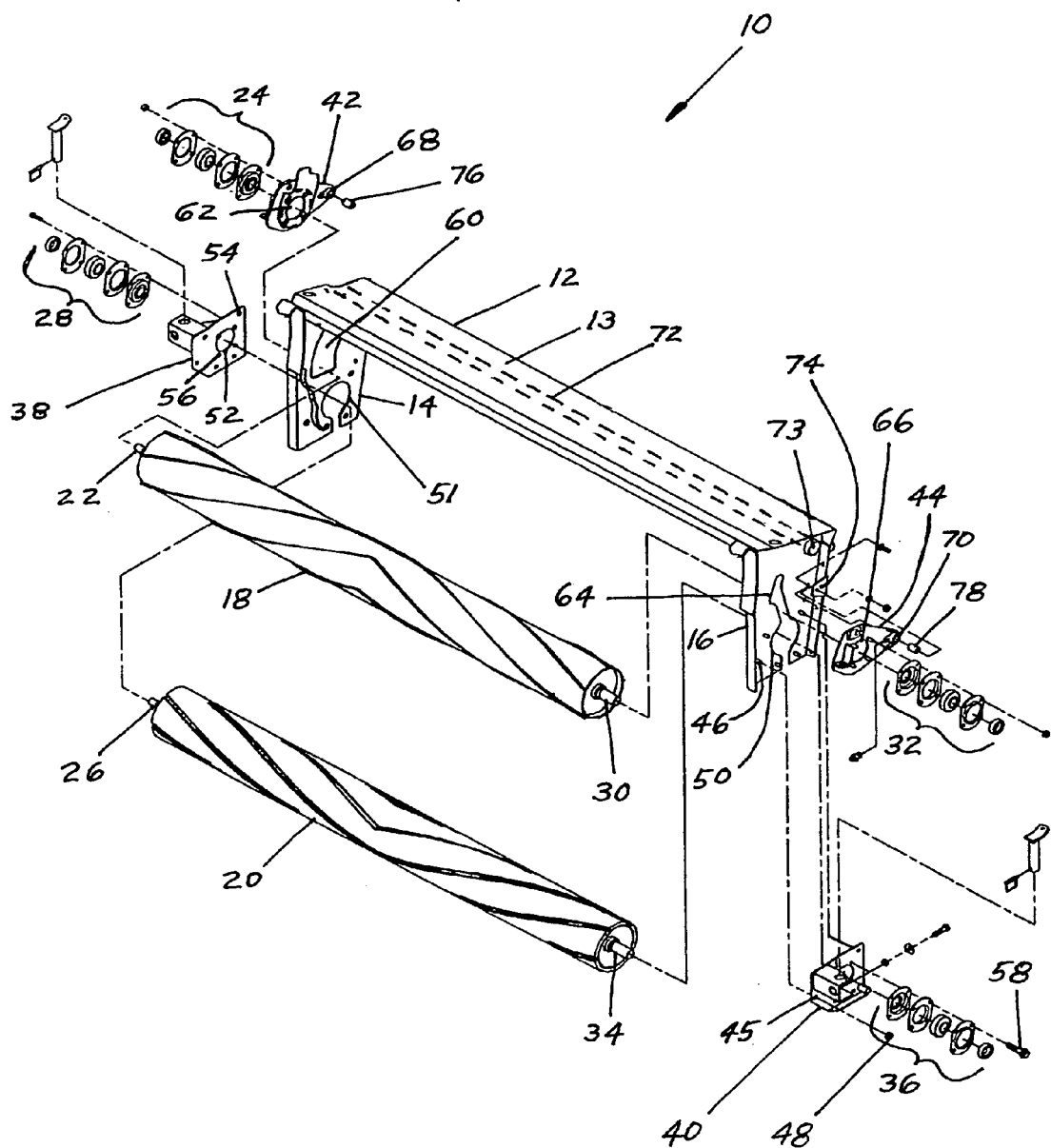
FIG. 1 is an exploded assembly view of a crop conditioner frame assembly showing the included components separately and indicating by the use of offset centerlines their alignment when installed.

FIG. 1 is an exploded assembly view of crop conditioner frame assembly 10 of the preferred embodiment of the invention showing the components separately and indicating by the use of offset centerlines their alignment when installed. The components are installed on conditioner frame 12 either on first side sheet 14 (shown on the left in FIG. 1) or second side sheet 16 (shown on the right in FIG. 1), which are integral parts of conditioner frame 12 suspended from top sheet 13. As indicted by their associated offset centerlines, upper conditioning roller 18 is installed below top sheet 13 of conditioner frame 12, and conditioning lower roller 20 is installed below upper conditioning roller 18. This is the conventional arrangement for such crop conditioning rollers, and they are also conventionally driven at first side sheet 14.

For drive power, shaft end 22 on upper conditioning roller 18 is connected to a first drive shaft (not shown) through first upper bearing assembly 24, and shaft end 26 on lower conditioning roller 20 is connected to a second drive shaft (not shown) through first lower bearing assembly 28. Typically, shaft ends 22 and 26 have splines to effectively receive the drive power. At second side sheet 16, shaft end 30 of upper conditioning roller 18 is held within second upper bearing assembly 32 and shaft end 34 of lower roller 20 is held within second lower bearing assembly 36.

Prior art crop conditioners use bearing assemblies that are smaller and not so strong as those now desired for use with higher pressure or larger rollers, but the present invention permits the use of both small roller shaft ends and bearings and also shaft ends and larger bearings that are required for higher pressure or larger crop conditioning rollers. In fact, conditioner frame assembly 10 of the present invention can accommodate bearings of many sizes. This variation in roller shaft ends and bearings is accomplished without any significant changes in the design of conditioner frame assembly 10.

The variation in conditioning roller shaft end size is essentially accomplished by limiting virtually all the changes to removable and interchangeable mounting fixtures 38, 40, 42 and 44. Each of these mounting fixtures is attached to one of the conditioner frame side sheets, and each mounting fixture holds a bearing assembly within which a conditioning roller shaft end is held.

This arrangement can be seen in FIG. 1 at all four bearing assemblies. For example, second lower bearing assembly 36, at the lower right of FIG. 1, is assembled onto lower mounting fixture 40, and shaft end 34 of lower conditioning roller 20 is inserted into second lower bearing assembly 36 at hole 50 of second side sheet 16. Lower mounting fixture 40 is held onto second side sheet 16 by slipping holes 45 in lower mounting fixture 40 over studs 46 on second lower side sheet 16, and tightening on nuts 48 (only one of which is seen in FIG. 1). The same construction is used at first side sheet 14 to which lower mounting fixture 38 is attached, and first lower bearing assembly 28 is attached to lower mounting fixture 38. Shaft end 26 of lower conditioning roller 20 is inserted into first lower bearing assembly 28 located in bearing hole 52 in lower mounting fixture 38 and in shaft hole 51 in first side sheet 14.

FIG. 2 is an enlarged plan view more clearly showing lower mounting fixture 38 from the same side as seen in FIG. 1. Lower mounting fixture 38 is used for attaching shaft end 26 of lower conditioning roller 20 to first side sheet 14 and for holding first lower bearing assembly 28 into which shaft end 26 fits. Lower mounting fixture 38 and mirror image lower mounting fixture 40 at the other end of lower conditioning roller 20 are essential to the invention because they are two of the interchangeable parts that make the accommodation to different design lower conditioning rollers and to the shaft ends on such different conditioning rollers.

The basic requirement for each different lower mounting fixture 38 (and lower mounting fixture 40) is that bearing hole 52 be sized and bearing assembly threaded mounting holes 56 be located properly to permit attachment of each individual bearing assembly anticipated for use. Thus, bearing hole 52 must be of a size to fit the lower bearing assembly that is to be used with the particular lower crop conditioning roller selected for the application, and bearing assembly mounting holes 56 must be located to match the mounting holes of that particular bearing assembly. Side sheet mounting holes 54 are maintained in the same location for all interchangeable lower mounting fixtures regardless of the bearing assembly size to implement the interchangeability. Thus, a change of lower conditioning rollers requires only a corresponding change in lower mounting fixtures 38 and 40 and bearing assemblies 28 and 36, all of which must be removed anyway to replace the lower conditioning roller, and essentially form a replacement kit.

The use of larger bearing assemblies does, however, add a further requirement to the preferred embodiment of the invention in that shaft holes 50 and 51 in side sheets 16 and 14 respectively, must be large enough to clear the largest bearing assemblies to be used with conditioner frame assembly 10.

The basis of the present invention is that when side sheet shaft holes 50 and 51 are large enough to accommodate the largest bearings that are used, the holes can also be used for any smaller bearings for smaller or lighter pressure conditioning rollers with smaller shaft ends. All that is required for any other design, including different size, lower conditioning roller is to install mounting plates 38 and 40 and bearings assemblies 28 and 36 that are sized for the different conditioning rollers.

The same basic approach used for mounting lower conditioning roller 20 is also used for mounting upper conditioning roller 18. That is, each set of interchangeable upper mounting fixtures 42 and 44 is constructed to hold a bearing assembly and shaft end for a specific design upper conditioning roller 18 that is to be used within crop conditioner assembly 10.

However, upper conditioning roller 18 has a different mounting means because it actually moves slightly up and away from lower conditioning roller 20 during the crop conditioning operation. The movement and the apparatus that implements it is well understood in the art, but will be briefly described below.

As seen in FIG. 1, similarly to lower conditioning roller 20, at slot 60 of first side sheet 14, shaft end 22 of upper conditioning roller 18 is inserted into first upper bearing assembly 24 mounted in bearing hole 62 in upper mounting fixture 42. At the other end of upper conditioning roller 18, at slot 64 in second side sheet 16, shaft end 30 is inserted into second upper bearing assembly 32 mounted in bearing hole 66 of upper mounting fixture 44. However, unlike lower conditioning roller 20, upper conditioning roller must move, so upper mounting fixtures 42 and 44 are not fixed relative to their associated side sheets.

Instead, upper mounting fixtures 42 and 44 include pivot holes 68 and 70, respectively, by which upper mounting fixtures 42 and 44 are attached, with spacers 76 and 78, to pivot points 74 (only one shown in FIG. 1) near the upper corners of side sheets 14 and 16. Upper conditioning roller 18 thus moves relative to lower conditioning roller 18 as upper mounting fixtures 42 and 44 pivot and move within side sheet slots 60 and 64. Upper mounting fixtures 42 and 44, are interconnected with torsion bar assembly 72 by conventional linkages (not shown), and therefore only permit upper conditioning roller 18 to move away from lower conditioning roller 20 against the force required to twist torsion bar assembly 72. This is a structure well known in the art of crop conditioners, and the apparatus typically includes controls (not shown) to vary the resistance to movement that torsion bar assembly 72 provides.

However, the requirements for torsion bar assembly 72 can surpass the range of adjustment capability when different design conditioning rollers are used, and the present invention uses different sizes of torsion bar assembly 72 to accommodate to such new requirements. Since torsion bar assembly 72 is essentially installed independently through mounting holes 73 (only one of which is seen in FIG. 1) it is a relatively simple matter to install a different torsion bar assembly and link it to upper mounting fixtures 42 and 44 when different conditioning rollers require it. Thus, with a minimum of changes in only the easily replaceable torsion bar assembly 72, the force restraining upper conditioning roller 18 can be adjusted for every crop condition.

FIG. 3 is an enlarged plan view more clearly showing interchangeable upper mounting fixture 42 that is installed at first side sheet 14 for holding upper conditioning roller 18. FIG. 3 shows upper mounting fixture 42 in the same view as seen in FIG. 1 with pivot hole 68 and spacer 76 on the right. Similarly to lower mounting fixture 38 previously described in regard to FIG. 2, upper mounting fixture 42 is used for holding first upper bearing assembly 24 into which shaft end 22 of upper conditioning roller 18 is inserted. Interchangeable upper mounting fixture 42 and similar upper mounting fixture 44 at the other end of upper conditioning roller 18 are essential to the invention because they make it possible to use a variety of upper conditioning rollers and the different shaft ends on such conditioning rollers.

Each different upper conditioning roller requires different bearings, but the use of different bearings is greatly simplified because each bearing is matched to its own mounting fixture. The basic requirement for each interchangeable upper mounting fixture 42 (and upper mounting fixture 44) is that bearing hole 62 be sized and bearing assembly mounting holes 80 be located to permit attachment of the specific required bearing assemblies for a particular conditioning roller selected for use with conditioner frame assembly 10. Thus, bearing hole 62 must be dimensioned to accommodate the selected upper bearing assembly that is to be used, and bearing assembly mounting holes 80 must be located to match the mounting holes of the bearing assembly.

Since side sheets are not one of the interchangeable assemblies, slots 60 and 64 in side sheets 14 and 16, respectively, are constructed to be large enough to accommodate the largest bearings that are used. This structure permits the slots to also be used for any smaller bearings. All that is required for any design upper conditioning roller is to install the specific upper mounting fixtures 42 and 44 holding bearings assemblies 24 and 32 that are sized for the particular conditioning rollers being used.

However, upper mounting fixture 42 differs from upper mounting fixture 44 in that it contains additional deflector 82. Deflector 82 is attached to upper mounting fixture 42 using the same holes 80 as are used to hold first upper bearing assembly 24 onto upper mounting fixture 42. Deflector 82 is discussed below, but it is necessitated by the enlarged size of slot 60 in side sheet 14 relative to slot 64 at the other end of upper conditioning roller 18.

Enlarged slot 60 eliminates the necessity of changing the upper conditioning roller drive components (not shown) when changing upper conditioning rollers. Such a change would otherwise be needed to achieve the required space and the correct relationship between the upper conditioning roller shaft end and the first upper bearing assembly for some roller designs, particularly those with the largest shafts. Instead of changing the upper conditioning roller drive components, which include universal joints to accommodate to the swinging movement of upper conditioning roller 18, the size of slot 60 is merely enlarged to permit upper bearing assembly 34 to move within the plane of side sheet 14 when some of the different designs of conditioning rollers are installed. This minor change in side sheet 14 is the only change required in the drive of upper bearing assembly 34 to maintain proper alignment and the required spacings.

Deflector 82 is, however, needed to counteract a potential problem arising from the enlargement of slot 60. Because crop is passing between the upper and lower conditioning rollers, there is a tendency for some of the crop to exit through large slot 60 in side sheet 14. Deflector 82 which, when upper mounting fixture 42 is installed, is positioned close to side sheet 14, is a very simple means to block the exiting of the crop through slot 60. The size of deflector 82 is essentially selected to block crop access to slot 60 in all positions of mounting fixture 42 and is designed for each particular combination of mounting fixture and slot. In the preferred embodiment, with a 110 mm diameter of bearing hole 62 and a max length of 384 mm for upper mounting fixture 42, the maximum height of deflector 82 is 310 mm.

The present invention thereby permits the use of multiple designs of conditioning rollers on only slightly modified crop conditioner frames with only the replacement of the rollers themselves, the four mounting fixtures on which only the holes need modification, and the torsion bar assembly, and the addition of a crop deflector on at least one mounting fixture.

It is to be understood that the form of this invention as shown is merely a preferred embodiment. Various changes may be made in the function and arrangement of parts; equivalent means may be substituted for those illustrated and described; and certain features may be used independently from others without departing from the spirit and scope of the invention as defined in the following claims.

For example, the invention may be installed in a either a crop conditioner frame that is built into a crop harvester or in a crop conditioner of the type that is an independent structure attached to a crop harvester. Furthermore, although in the preferred embodiment bolts or studs may be disclosed for certain applications, any suitable fasteners are useable in all such locations.

What is claimed as new and for which Letters patent of the United States are desired to be secured is:

1. In a crop conditioner frame of the type comprising: a frame structure with a top sheet to which are attached a first side sheet and a second side sheet; an upper conditioning roller installed below the top sheet and with shaft ends held within upper bearing assemblies installed within pivoting upper mounting fixtures that are attached to pivot points at the first and second side sheets and with one shaft end driven to rotate the upper conditioning roller; a lower conditioning roller installed below the upper conditioning roller and with shaft ends held within lower bearing assemblies installed within lower mounting fixtures that are attached to the first and second side sheets by fasteners and with one shaft end driven to rotate the lower conditioning roller; and a torsion bar assembly installed between the first side sheet and the second side sheet and interconnected to the pivoting upper mounting fixtures to force the upper conditioning roller toward the lower conditioning roller; the improvement comprising:

the upper conditioning roller, the lower conditioning roller, and the torsion bar assembly installed so that, without modification to the first and second side sheets, the upper conditioning roller is interchangeable with at least one different design upper conditioning roller, the lower conditioning roller is interchangeable with at least one different design lower conditioning roller, and the torsion bar assembly is interchangeable with at least one different design torsion bar assembly.

2. In a crop conditioner frame of the type comprising: a frame structure with a top sheet to which are attached a first side sheet and a second side sheet; an upper conditioning roller installed below the top sheet and with shaft ends held within upper bearing assemblies installed within pivoting upper mounting fixtures that are attached to pivot points at the first and second side sheets and with one shaft end driven to rotate the upper conditioning roller; a lower conditioning roller installed below the upper conditioning roller and with shaft ends held within lower bearing assemblies installed within lower mounting fixtures that are attached to the first and second side sheets by fasteners and with one shaft end driven to rotate the lower conditioning roller; and a torsion bar assembly installed between the first side sheet and the second side sheet and interconnected to the pivoting upper mounting fixtures to force the upper conditioning roller toward the lower conditioning roller; the improvement comprising:

at least two interchangeable upper conditioning rollers of different designs with the shaft ends of each individual interchangeable upper conditioning roller installed within two upper bearing assemblies sized for the individual interchangeable upper conditioning roller, with the upper bearing assemblies installed within pivoting upper mounting fixtures sized for the particular upper bearing assemblies, and with the pivoting upper mounting fixtures for all the interchangeable upper conditioning rollers attachable to the same pivot points at the first and second side sheets; and at least two interchangeable lower conditioning rollers of different designs with the shaft ends of each individual interchangeable lower conditioning roller installed within two lower bearing assemblies sized for the individual interchangeable lower conditioning roller, with the lower bearing assemblies installed within lower mounting fixtures sized for the particular lower bearing assemblies, and with the lower mounting fixtures for all the interchangeable lower conditioning rollers attachable to the same fastener points on the first and second side sheets.

3. The crop conditioner frame of claim 2 wherein the torsion bar assembly is installed to be interchangeable with at least one other torsion bar assembly of a different design.

4. The crop conditioner frame of claim 2 wherein the upper bearing assembly that is located at the shaft end driven to rotate the upper conditioning roller is located at a side sheet in which there is a slot large enough to permit the upper bearing assembly to be located and move within the slot.

5. The crop conditioner frame of claim 4 wherein the pivoting upper mounting fixture within which the upper bearing assembly at the driven shaft end is installed includes a deflector to prevent crop from exiting through the slot in the side sheet.

* * * * *